United States Patent [19]

Kingsbury et al.

[11] Patent Number: 4,507,138
[45] Date of Patent: Mar. 26, 1985

[54] DELIVERY SYSTEM FOR GLASSWARE FORMING MACHINE

[75] Inventors: Charles M. Kingsbury, Manchester; Bruce R. Beckwith, Unionville; Anthony Messina, Enfield, all of Conn.

[73] Assignee: Emhart Industries, Inc., Farmington, Conn.

[21] Appl. No.: 472,315

[22] Filed: Mar. 4, 1983

[51] Int. Cl.³ .............................................. C03B 7/16
[52] U.S. Cl. ...................................... 65/158; 65/304; 65/164; 65/225
[58] Field of Search ............... 65/165, 164, 207, 221, 65/225, 304, DIG. 13, 158

[56] References Cited

U.S. PATENT DOCUMENTS

| | | | |
|---|---|---|---|
| 1,379,593 | 5/1921 | Peiler | 65/165 |
| 1,637,452 | 8/1927 | Nelson, Jr. | 65/207 |
| 3,142,553 | 7/1964 | Cook | 65/304 |
| 3,560,184 | 2/1971 | Hughes et al. | 65/158 |
| 3,592,624 | 7/1971 | Dahms | 65/225 |
| 3,775,083 | 11/1973 | Nebelung et al. | 65/207 |
| 4,339,264 | 8/1980 | Dahms | 65/238 |

Primary Examiner—S. Leon Bashore
Assistant Examiner—Michael K. Boyer
Attorney, Agent, or Firm—Arthur B. Moore

[57] ABSTRACT

A new delivery system for use with glassware forming machines of the rotating table type having a plurality of continuously rotating spaced forming units spaced about the periphery thereof. The delivery system includes a plurality of gob guiding units each having a scoop, trough and deflector secured to a corresponding oscillating frame. A vertical pivot shaft supports each scoop and is operatively connected with an actuating means to move the corresponding scoop laterally between a delivery position and a reject position. The actuating means is responsive to a plurality of gob reject actuators in order to enable selective delivery or rejection of individual gobs of selected forming units.

6 Claims, 7 Drawing Figures

DELIVERY SYSTEM FOR GLASSWARE FORMING MACHINE

BACKGROUND OF THE INVENTION

1. Field of the Invention

The invention relates generally to glassware forming machines of the rotating table type having a plurality of continuously rotating, circumferentially spaced forming units. More particularly, the invention relates to a delivery system for selectively delivering and rejecting gobs of molten glass to the continuously rotating blank molds of the machine.

2. Description of the Prior Art

Glassware forming machines of the rotating table type are well known in the glassware manufacturing industry. One type of such machine is shown in U.S. Pat. No. 1,979,211 and is commonly referred to as the "Emhart H-28 Machine." This type of machine is a single table, continuous rotary motion machine having a plurality of individual sections or forming units mounted for rotation about the axis of the machine. These machines have been available with different numbers of individual forming units, thus constituting, for example, a 6, 12 or 18 section machine. In such H-28 machines each individual forming unit produces one glassware article for each complete revolution or cycle of the machine and will therefore be referred to herein as H-28 single gob machines.

A significant improvement over the H-28 single gob machine is disclosed in U.S. Pat. No. 4,339,264 which describes an H-28 double gob machine where each individual forming unit produces two glassware articles for each complete cycle. This patent is hereby incorporated by reference in this disclosure in its entirety.

One of the unique features of the prior art H-28 double gob machine is its delivery system, that is, the manner in which it guides or delivers gobs to the continuously rotating blank molds of the machine. Each set of inner and outer blank molds has associated with it a gob guiding unit consisting of a scoop, trough and deflector for guiding gobs into the blank molds. Each gob guiding unit oscillates over a predetermined arcuate path about a delivery system axis parallel to the machine axis so that in one arcuate direction the speed of the deflector of the gob guiding unit approximates that of the continuously moving blank mold to facilitate gob delivery.

The delivery of gobs to the blank molds of a continuously rotating H-28 machine, whether single or double gob, is quite important. The gob must be delivered by the gob guiding unit while the blank molds are moving. In the H-28 single gob machine this may be accomplished by matching the arcuate speed of the gob guiding unit (in at least the direction where it moves with the blank) to that of the continuously moving blank mold. The same problem exists in H-28 double gob machines although compounded by the fact that, in addition to both gobs having to be delivered while the corresponding molds are moving, both gobs should be delivered at the same time with respect to each other.

Prior art H-28 double gob machines have a disadvantage in that the manner in which the scoops are mounted and pivoted into a gob reject position does not allow for streaming or for an easy change of the orifice ring of the feeder which must be periodically replaced. The prior art machines require that a secondary cullet chute be positioned above the scoops and beneath the shears prior to any orifice ring change. It is accordingly an object of this invention to provide a delivery system efficiently enabling each scoop to be adequately removed from beneath its corresponding feeder orifice to gob reject position.

Prior art H-28 double gob machines were also provided with mechanical, cam operated air valves for producing gob reject signals to reject all gobs from a selected forming unit. No means were available for rejecting only individual gobs for individual sections. Moreover, the mechanical valves had a relatively short life. It is accordingly another object of this invention to provide an electronic switch actuating means for rejecting a selected one or all gobs from a selected forming unit.

SUMMARY OF THE INVENTION

These and other objects of this invention are achieved by the preferred embodiment which comprises an improvement in a delivery system of a glassware forming machine having a main rotating table including a plurality of forming units spaced about the periphery thereof, each unit having at least two blank molds which, in operation, rotate about a first axis at a first and second radius respectively. The machine is provided with at least two gob guiding units for periodically guiding gobs of molten glass to a corresponding one of said blank molds at predetermined respective positions thereof about said first axis, each said gob guiding unit comprising a scoop, a trough, and a deflector mounted on a pivotable frame for being oscillated about a second axis parallel to said first axis. The improvement comprises:

- a plurality of vertical pivot shafts each pivotably secured to a respective one of said gob guiding unit frames;
- a plurality of support arms each having one end fixedly connected to one end of a respective one of said pivot shafts and the other end secured to a respective one of said scoops, each said support arm being pivotable about the axis of its respective pivot shaft;
- a plurality of actuating means each secured to the other end of a respective one of said pivot shafts for pivoting the corresponding one of said support arms about its respective pivot shaft axis to move the corresponding one of said scoops between a delivery position and a reject position.

The invention further comprises means for selectively actuating any or all of said actuating means to selectively reject any or all corresponding gobs.

DESCRIPTION OF THE PREFERRED EMBODIMENT

Figure 1:
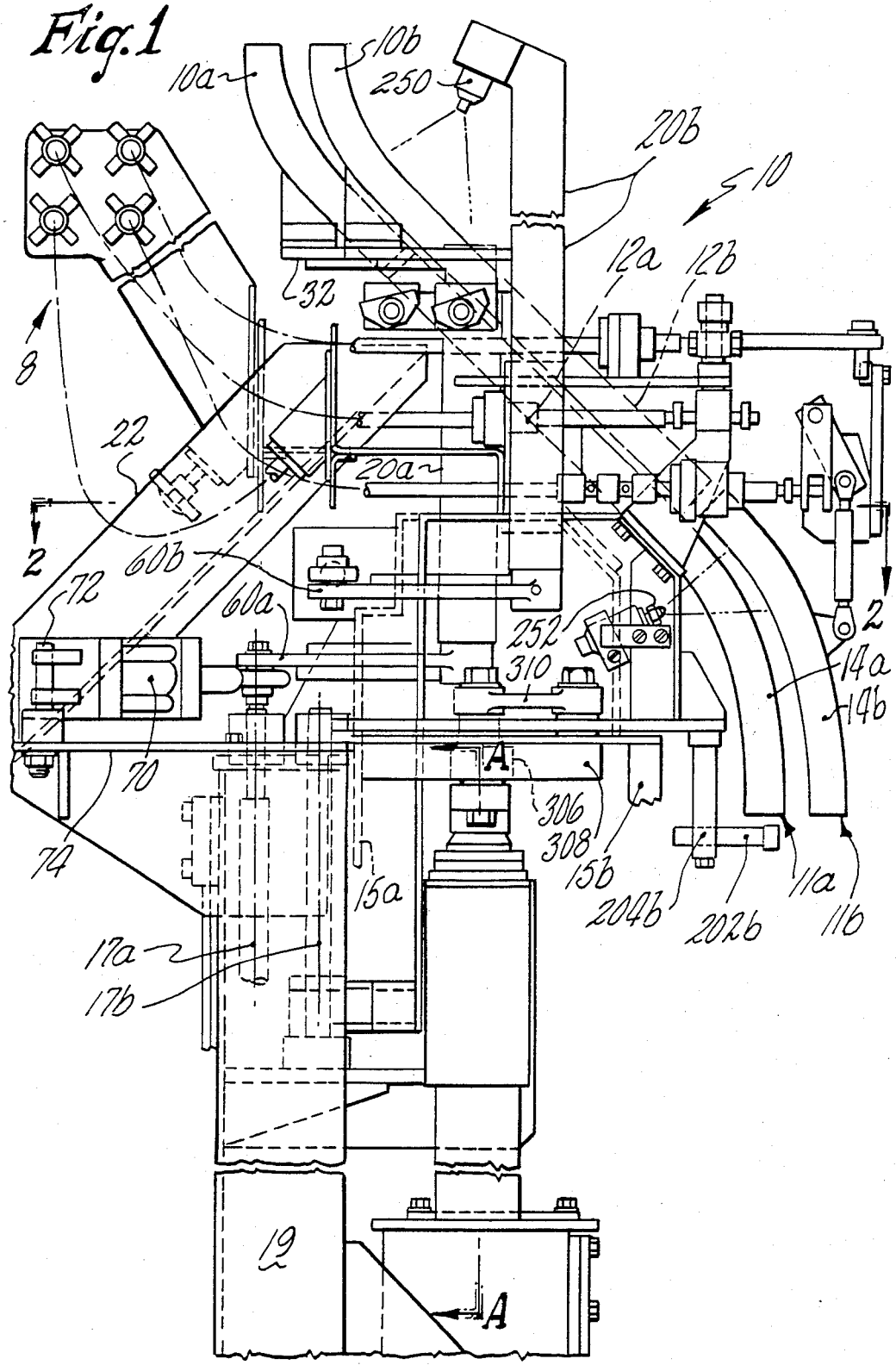
FIG. 1 is a partially cut away diagrammatic left side elevational view of a delivery system constructed in accordance with the principles of the invention.

Referring now to FIG. 1 there is shown a side elevational view of delivery system 10 which includes a pair of gob guiding units 11a and 11b, one associated with each feeder orifice (not shown). Each gob guiding unit includes a scoop 10, trough 12 and deflector 14. While the feeder orifices and shears are not shown it will be understood that the scoop of each gob guiding unit is situated under a feeder orifice to receive gobs as they are cut by the shears. The "a" series of components constitute the delivery components for the outer molds of the machine and the "b" components relate to the inner molds, the terms "inner" and "outer" indicating the relative radial positions of the blank molds with respect to the machine axis. While the preferred embodiment of the invention is described with reference to a double gob machine, it will be understood that the invention may be adapted for use with machines having more than two molds per forming unit.

FIG. 1 also shows a side elevational view of a deflector adjustment system 8 which is more particularly described in a U.S. application Ser. No. 472,391 filed contemporaneously herewith and assigned to the assignee of the present invention.

Each gob guiding unit 11Aa and 11b includes a deflector and trough support frame 15a and 15b, respectively, and scoop support and pivot assemblies 20a and 20b, respectively. Each frame 15a and 15b is pivotally attached to main frame 19 to pivot about axes 17a and 17b respectively. For clarity, frame 15a is shown in phantom.

As in the prior art H-28 double gob machine disclosed in U.s. Pat. No. 4,339,264, each gob guiding unit oscillates about its respective pivot axis in order to arcuately move the deflectors along a path which approximately corresponds to a portion of the path of the continuously rotating blank molds. There are preferred times when the paths of the deflectors and blank molds overlap during which a gob can be delivered. As will be explained below, however, this invention constitutes an improvement over the prior art delivery system.

SCOOP PIVOT ASSEMBLY

One of the disadvantages of the prior art delivery system was its inability to move the scoops sufficiently out of the way to facilitate streaming with or without the orifice and to provide enough clearance for an easy orifice ring change. While the scoop was sufficiently pivotable about a horizontal axis to effect the gob reject function (clearing the gob to permit it to fall into a cullet chute), the clearance was inadequate for an orifice ring change. The present invention overcomes this disadvantage by providing scoop pivot assemblies 20a and 20b for pivoting each scoop out of the way about a vertical axis. This interrupts the feeding of selected gobs to the blank molds and permits the glass from the corresponding feeder orifice to fall directly into cullet chute 22. This pivoting motion of each scoop pivot assembly permits selective gob reject, as will be explained below, and also facilitates orifice ring change. The structure also permits a wider cullet chute than possible with the prior art design.

Scoop pivot assemblies 20a and 20b will be more clearly understood by reference to FIGS. 2, 3, 4 and 5. Since the operations of each scoop pivot assembly 20a and 20b are very similar, the description herein will refer primarily to scoop pivot assembly 20a.

Figure 2:
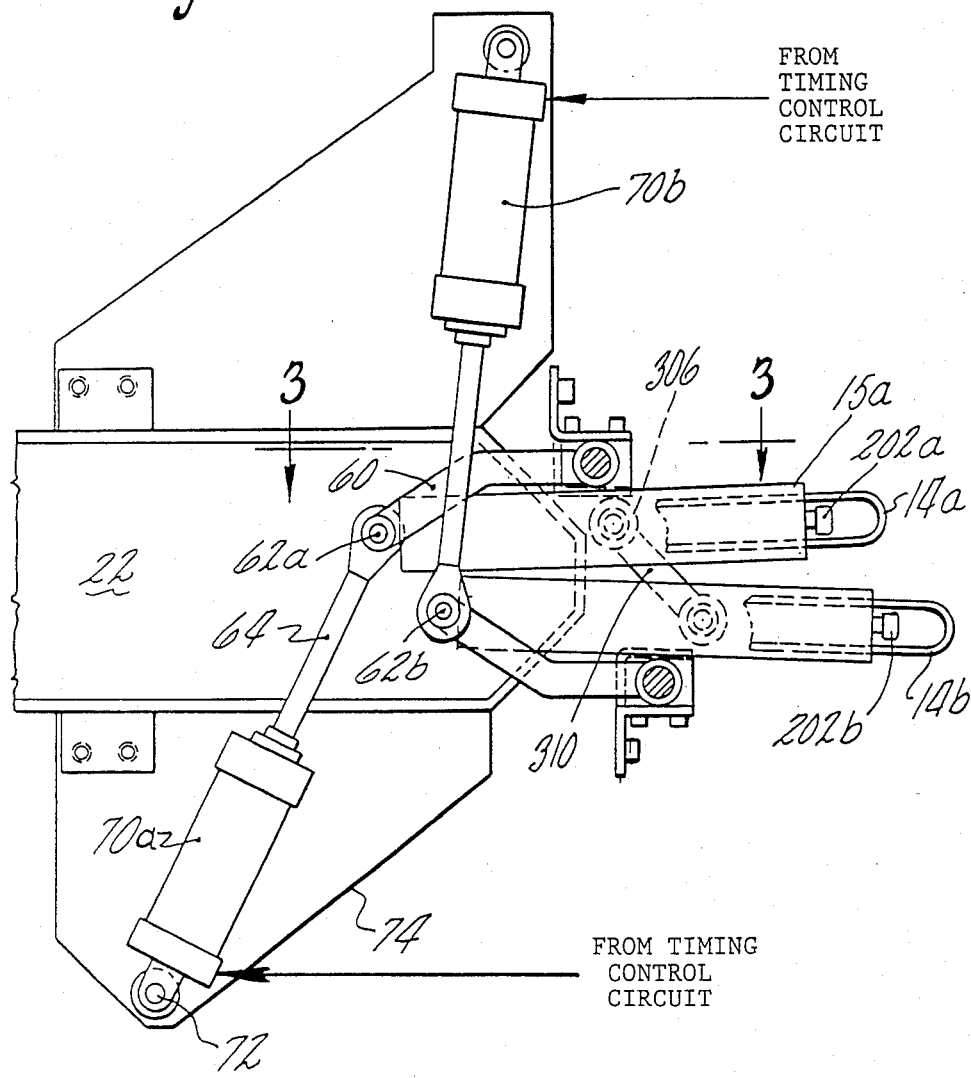
FIG. 2 is a diagrammatic plan view of a portion of FIG. 1 taken along the lines 2—2 with certain portions removed for clarity.

FIG. 2 shows a diagrammatic plan view of a portion of FIG. 1 and includes some elements merely outlined to show their relative positions and others omitted for clarity.

Figure 3:
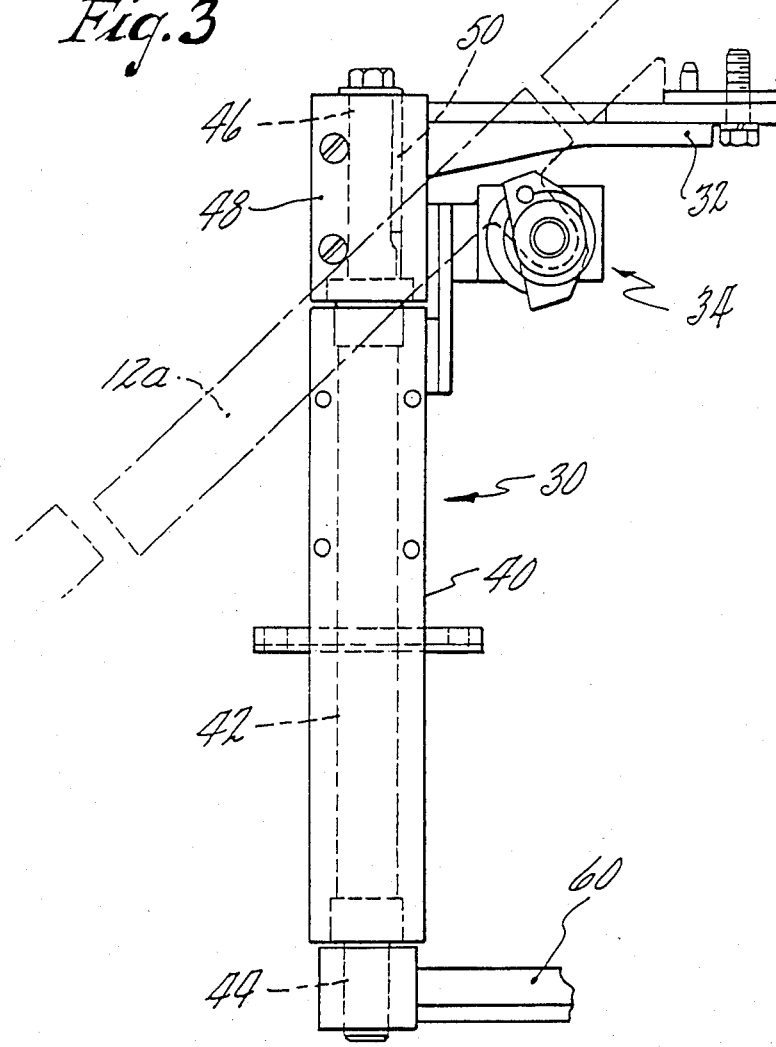
FIG. 3 is a side elevational view of a scoop pivot assembly taken along the lines 3—3 in FIG. 2.

As shown in FIG. 3, scoop 10a is supported in position beneath its corresponding feeder orifice (not shown) by pivot assembly 20 having a lateral support arm 32 (note that hereafter the "a" and "b" designations will generally not be used unless necessary to distinguish features of the inner and outer delivery means). Trough 12 is supported on trough support assembly 34 and is pivotable about shaft 35. It should be noted that FIG. 3 is an elevational view of FIG. 2 along the lines 3—3 although many components shown in FIG. 3 are omitted from FIG. 2 for clarity.

Figure 4:
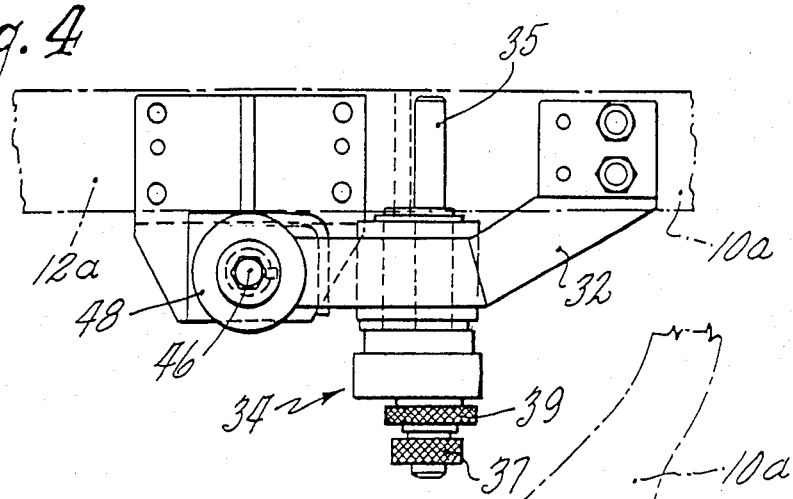
FIG. 4 is a plan view of FIG. 3.

As best seen in FIG. 4 trough support 34 has a pair of knurled controls 37 and 39 for adjusting shaft 35 to horizontally align the upper end of trough 12 with scoop 10. Trough support 34 also has a detended knob which is rotated to vertically align the upper end of trough 12 with scoop 10.

Referring again to FIG. 3, pivot assembly 20 comprises a fixed outer portion 40 secured to frame 15 of its corresponding gob guiding unit (by means not shown) and an inner rotatable shaft 42 having a lower end 44 and an upper end 46. Lateral support arm 32 is secured to an upper housing 48 which is keyed at 50 to upper shaft end 46 and, as best seen in FIG. 4, has a dog leg shape in order to accommodate trough 12 and align it with scoop 10.

The lower shaft end 44 is secured to a similarly dog leg shaped link 60, best seen in FIG. 2, the other end of which is pivotably secured about axis 62 to rod 64 of piston and cylinder assembly 70. Cylinder 70 is pivotably secured at axis 72 to frame member 74 which is secured to main frame 19. Cylinder 70 is a conventional air cylinder assembly the piston of which is connected to rod 64 which is shown in its fully retracted position in FIG. 2.

Figure 5:
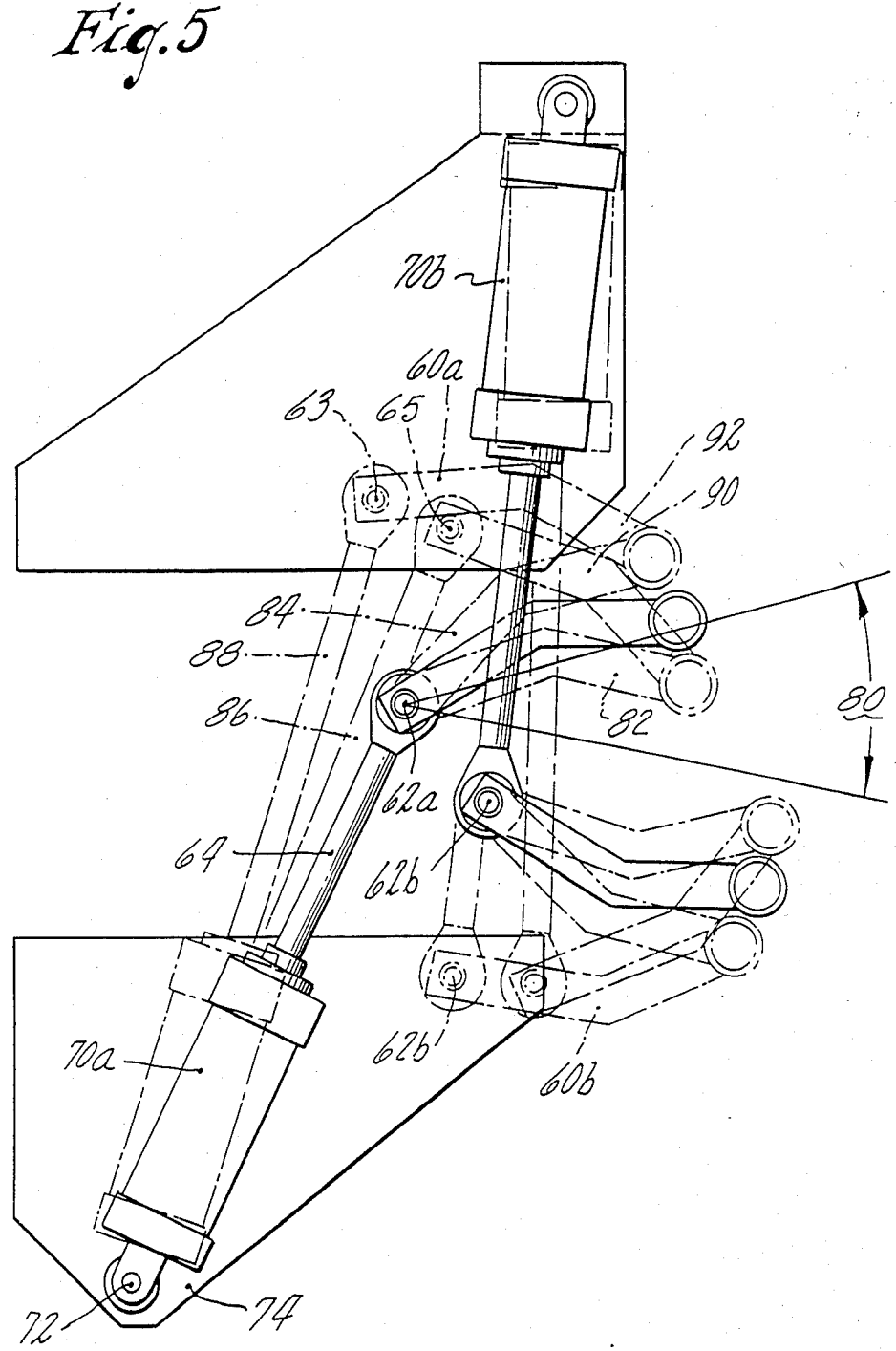
FIG. 5 is a diagrammatic view of a portion of FIG. 2 showing the positions of various members at various points in the delivery cycle.
Figure 7:
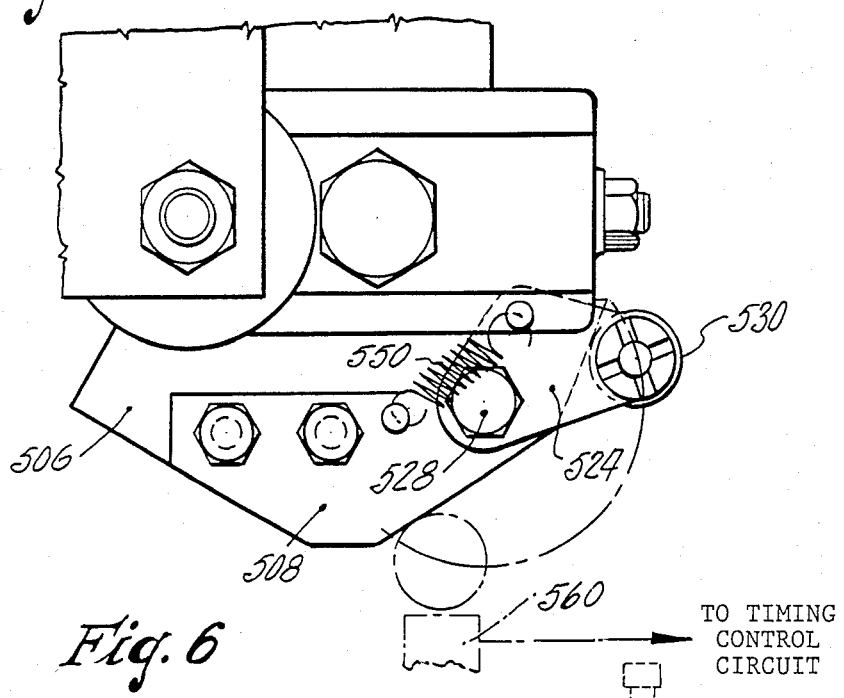
FIGS. 7 is a plan view of FIG. 6.

Referring now to FIG. 5, air cylinders 70a and 70b are shown in fully retracted positions in solid lines and in fully extended positions in phantom. Dog links 60a and 60b are shown in positions corresponding to the retracted and extended positions of rods 64 and pivot shafts 42 are shown in positions corresponding to the oscillatory motion of frames 15a and 15b.

By reference to FIGS. 2 and 3 it will be understood that link 60 and arm 32 are essentially parallel (although as best seen in FIG. 1, at different levels relative to their respective pivot assembly) and extension of rod 64 will cause lateral support arm 32 to pivot about the axis of shaft 42, thus moving corresponding scoop 10 from a delivery position underneath its corresponding orifice to a reject position, permitting streaming or gob rejection into cullet chute 22. These positions of the scoop may be equated to the positions of dog link 60 shown in FIGS. 2 and 5. Note that each axis 62a and 62b is aligned with its respective feeder orifice and pivot axes 17a and 17b, respectively, when the pistons are fully retracted. Cylinder 70 is actuated in response to a timing control system and gob reject means (explained below).

Referring now to FIG. 5 the delivery and reject positions of cylinders 70a and 70b and associated components are shown superimposed upon the oscillating motion of frames 15a and 15b. It is understood that frame 15a normally oscillates along arc 80 and frame 15b similarly oscillates but along a slightly shorter arcuate path (not shown). When there is no gob reject signal, cylinder 70 will keep rod 64 in its retracted position causing dog link 60 to oscillate between delivery positions 82 and 84. This motion keeps the scoop aligned with its orifice at all times even though frame 15 is oscillating. When a gob reject signal activates cylinder 70 the arcuately oscillating motion of dog link 60 and corresponding arm 32 is superimposed upon the motion of extended rod 64 causing it to oscillate between reject positions 86 and 88 as frame 15 oscillates through its normal path, thus causing the end of rod 64 to oscillate between points 63 and 65 as shown. This oscillatory motion of dog link 60 (and corresponding lateral support arm 32) between reject positions 90 and 92 does not affect the gob reject function since at both extremes of this oscillatory motion the scoop is removed from beneath its corresponding orifice. The delivery system disclosed herein is designed to selectively deliver or reject any one or all gobs to selected forming units. The operator may select, with respect to each forming unit, whether to deliver gobs to the inner or outer blank molds of a particular forming unit. The selection is accomplished by setting a gob reject operator trip device 500 (shown in FIG. 6) in either one of two states.

Figure 6:
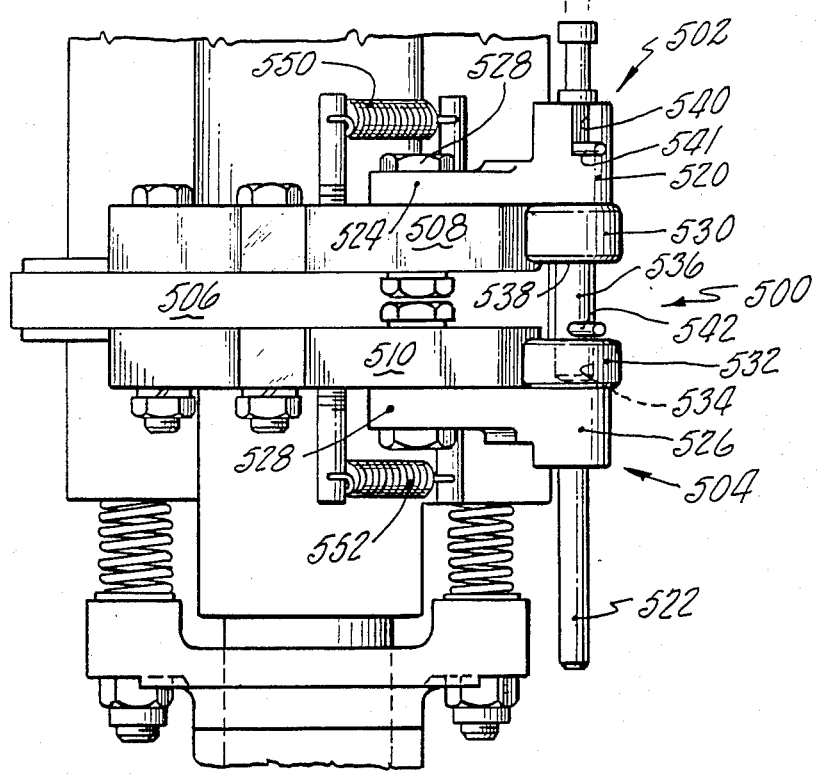
FIG. 6 is a front elevational view of a portion of the gob reject actuator mounted on each forming units.

Each forming unit is provided with an actuator or trip device 500 enabling the operator to selectively reject gobs intended for either the inner or outer blank molds or both. As shown in FIG. 6 trip device 500, mounted high on the forming unit periphery, includes an inner blank trip lever 502 and an outer blank trip lever 504 mounted on a common trip frame 506. Frame 506 is an integral part of the press head of the machine and provides a convenient, radially distant point for mounting trip device 500. Upper base plate 508 and lower base plate 510 provide a means for securing trip device 500 to frame 506. Trip levers 502 and 504 include vertical shaft handles 520 and 522, respectively, each of which is secured to a pivot plate 524 and 526, respectively. Each plate 524 and 526 is pivotably secured to its respective base plates 508 and 510 to pivot about a common axis 528.

Shaft handles 520 and 522 are designed to be moved together or separately. Each handle, 520 and 522 is provided with an annular trigger portion 530 and 532, respectively. Lower handle 522 is provided with a recess 534 in its trigger portion 532 for receiving the end of joining rod 536 which is slidably mounted within bore 538 of shaft handle 520. Rod 536 is provided with stop pins 541 and 542. Shaft handle 520 is provided with slot 544 for receiving pin 538 upon rotation of rod 536, thereby permiting the end of rod 536 to mate with recess 534 thus joining levers 502 and 504 for common movement about axis 528. As shown in full in FIG. 6 levers 502 and 504 are joined. The up position of rod 536 enables separate movement of the trip levers and is shown in phantom.

As best seen in FIG. 6, levers 502 and 504 are retained in either delivery position (full lines) or reject position (phantom lines) by over-center springs 550 and 552, respectively. The operator may move one or both levers to the reject position where trigger portions 530 and 532 will move past sensors 560 fixedly mounted relative to the machine. The sensors are mounted at a predetermined position relative to the machine axis and at a height where they will detect trigger portions 530 and 532 if they are set in reject. Note that only the sensor associated with trigger portion 530 shown in FIG. 6 although it will be understood that each trigger portion has an associated sensor. First and second sensor means comprising sensors 560 are associated with trigger portions 530 and 532 which each provide a gob reject signal to a timing control circuit in order to actuate corresponding cylinders 70a and 70b. In the preferred embodiment trigger portions 530 and 532 are metallic and sensors 560 are magnetic or Hall effect type sensors which produce an output signal upon sensing a corresponding trigger portion in close proximity.

Those skilled in the art will understand that numerous modifications and improvements may be made to the preferred embodiment of the invention disclosed herein without departing from the spirit and scope thereof.

What is claimed is:

1. In a delivery system of a glassware forming machine of the type having a main rotating table including a plurality of forming units spaced about the periphery thereof, each unit having at least two blank molds which, in operation, rotate about a first axis at a first and second radius respectively, the machine provided with at least two gob guiding units for periodically guiding gobs of molten glass to a corresponding one of said blank molds at predetermined respective positions thereof about said first axis, each said gob guiding unit comprising a scoop, a trough, and a deflector mounted on a pivotable frame for being oscillated about a second axis parallel to said first axis, the improvement comprising:

a plurality of vertical pivot shafts each pivotably secured to a respective one of said gob guiding unit frames;

a plurality of support arms having one end fixedly connected to one end of a respective one of said pivot shafts and the other end secured to a respective one of said scoops, each said support arm being pivotable about the axis of its respective pivot shaft;

a plurality of actuating means each secured to the other end of a respective one of said pivot shafts for pivoting the corresponding one of said support arms about its respective pivot shaft axis to move the corresponding one of said scoops between a delivery position and a reject position; and means for selectively rejecting any or all of the gobs intended for delivery to a predetermined one of said blank molds by causing ones of said actuating means to move their corresponding scoops to a reject position.

2. An apparatus according to claim 1 wherein said selective rejection means comprises:

a plurality of gob reject actuators mounted on each of said forming units for rotation therewith, each of said gob reject actuators corresponding to a respective one of the blank molds of each of said forming units, each of said gob reject actuators for being set in either a reject position or a delivery position;

a plurality of proximity gob reject sensors fixedly secured relative to said machine for detecting the passage of those of said gob reject actuators placed in said reject position, each of said sensors for producing a reject signal representative of said detection;

means responsive to said reject signal to actuate selected ones of said actuating means.

3. An apparatus according to claim 2 wherein said gob reject actuators comprise:

a plurality of actuating lever means secured to each of said forming units for rotation therewith, said actuating lever means having a first lever associated with one of said blank molds and a second lever associated with the other said blank molds, said first and second lever selectively independently or jointly moveable from a delivery position to a reject position.

4. An apparatus according to claim 3 wherein said reject position of said actuating lever means is at a greater radius relative to the axis of said forming machine than said delivery position.

5. An apparatus according to claim 3 wherein said plurality of proximity gob rejection sensors comprise:
first and second sensor means fixedly mounted relative to said machine for detecting said first and second levers, respectively, at said reject position and for producing a first and second reject signal, respectively, in response thereto.

6. An apparatus according to claim 3 wherein said first and second levers are each respectively held in the selected delivery or reject position by an over-center spring.

* * * * *